United States Patent [19]
Miller

[11] 3,915,270
[45] Oct. 28, 1975

[54] MARINE CLUTCH SHIFT RING HAVING A LIMITED ROTATION

[75] Inventor: Kenneth H. Miller, Syracuse, N.Y.

[73] Assignee: American Challenger Corporation, Louisville, Colo.

[22] Filed: Aug. 29, 1974

[21] Appl. No.: 501,850

[52] U.S. Cl. ................ 192/21; 192/48.91; 192/51; 192/94; 74/333; 74/378
[51] Int. Cl.² .................... F16D 11/06; F16D 21/04; F16H 3/14; F16D 19/00
[58] Field of Search .............. 192/21, 35, 48.91, 51, 192/65, 94; 74/333, 377, 378

[56] References Cited
UNITED STATES PATENTS

| | | | |
|---|---|---|---|
| 1,355,152 | 10/1920 | Laird | 74/378 X |
| 2,735,528 | 2/1956 | Dodce | 192/48.91 |
| 2,795,964 | 6/1957 | Short | 192/48.91 X |
| 2,942,712 | 6/1960 | Altmann | 192/48.91 X |
| 2,993,579 | 7/1961 | Altmann | 192/48.91 X |
| 3,269,497 | 8/1966 | Bergstedt | 192/51 |

Primary Examiner—Samuel Scott
Assistant Examiner—Lance W. Chandler
Attorney, Agent, or Firm—Woodcock, Washburn, Kurtz & Mackiewicz

[57] ABSTRACT

A clutch mechanism includes forward and reverse driving gears rotatably mounted on an input shaft which has first and second oppositely pitched driving spiral threads thereon. First and second clutch elements engage the spiral threads on the input shaft. In the neutral position the clutch elements rotate with the input shaft intermediate the forward and reverse gears. When the rotation of either clutch element is impeded, the spiral threads drive the clutch element axially into engagement with a selected driving gear. An improved shift mechanism includes a shift ring disposed between the first and second clutch elements. Axial movement of the shift ring causes uniform 360° engagement between an outer annular collar on the shift ring and a matching annular surface on the clutch element. A coil spring coupled between the shift ring and the shift linkage resist rotation of the ring, and a pin extending from the linkage into a slot formed in the ring limits annular rotation of the ring. The spring-biased, subsequently stationary shift ring slows the rotation of the clutch element on the input shaft in reaction to which the spiral threads on the input shaft drive the clutch element in an axial direction to effect clutch engagement or disengagement with a selected gear. For static shifting, the shift ring is allowed to rotate with the clutch element but against the force of the spring as the clutch member traverses the spiral threads.

11 Claims, 3 Drawing Figures

MARINE CLUTCH SHIFT RING HAVING A LIMITED ROTATION

BACKGROUND OF THE INVENTION

The present invention relates to an improved shifting mechanism for a marine clutch and, more specifically, to to improved means for effecting the engagement of a selected drive gear.

In marine drives, both dog and friction type clutches have been employed in the past. Dog type clutches, however, necessarily operate with a jerk when engaged, particularly when engine speed is high. Friction clutches, on the other hand, require a considerable amount of power for actuation and further are not well suited to operation by remote control.

In U.S. Pat. No. 3,212,349 -Bergstedt, there is described a use of a cone type clutch in a marine drive system. This cone clutch has the advantage that there is a natural force driving the two mating clutch surfaces into engagement one with the other. While the engagement of the parts is good with this clutch mechanism the disengagement has been found to present a problem. The Bergstedt mechanism uses a disengagement arrangement whereby the mating cone clutch surfaces are literally hammered out of engagement one with the other. This arrangement is subject to malfunction.

The shift mechanism of this invention is for use in conjunction with the clutch claimed in the application of Alan Brownlie, Ser. No. 441,205, Filed Feb. 11, 1974. The shift mechanism and clutch are applicable to and can be used in the marine drive fully described in the copending application of Brownlie and Baly Ser. No. 416,228, filed Nov. 15, 1973. A related mechanism is described in copending application of Robert F. La Follete Ser. No. 501841 filed Aug. 29, 1974. (M-564) While the mechanism of La Follette comprises many advantages over prior-art arrangements it has some disadvantages which are sought to be overcome by the teachings of the present inventor.

It is therefore an object of the present invention to provide simplified means for effecting the engagement of alternate driving gears by clutch elements.

It is another object of the invention to provide means for axially bringing clutch elements into engagement with selected driving gears, without procuring the misalignment of the clutch elements.

It is still another object of the present invention to provide a shifting means which will afford sufficient countertorque to cause engagement of clutching elements during dynamic shifting yet allow sufficient rotation thereof to facilitate static shifting.

SUMMARY OF THE INVENTION

Briefly stated, in accordance with one aspect of the invention the foregoing objects are achieved by providing a pair of clutching elements having clutching surfaces thereon adapted to engage corresponding surfaces in a selected driving gear. The clutch elements are mounted on an input shaft and engaged thereby by means of helical threads. A shift ring disposed between the clutch elements may be axially displaced to engage one of the elements. Rotation of the shift ring is resiliently constrained so that the ring may rotate along with an engaged clutch element as the element is moved along the helical threads during static shifting. During dynamic shifting stop means prevent continued rotation of the ring, the non-rotating ring then producing a reverse-torque drag on the clutch element. The torque drag thus provided causes the clutch element to be driven axially along the helical threads on the input shaft, and thus into engagement with a selected driving gear in one embodiment, annular spring means are disposed between the shifting ring and ones of the clutch elements to keep the elements from misaligning or "cocking" during engagement thereof by the shifting ring.

BRIEF DESCRIPTION OF THE DRAWINGS

While the specification concludes with claims particularly pointing out and distinctly claiming the subject matter which is regarded as the invention, it is believed that the invention will be better understood from the follwing description of the preferred embodiment taken in conjunction with the accompanying drawings in which:

DESCRIPTION OF A PARTICULAR EMBODIMENT

Figure 1:
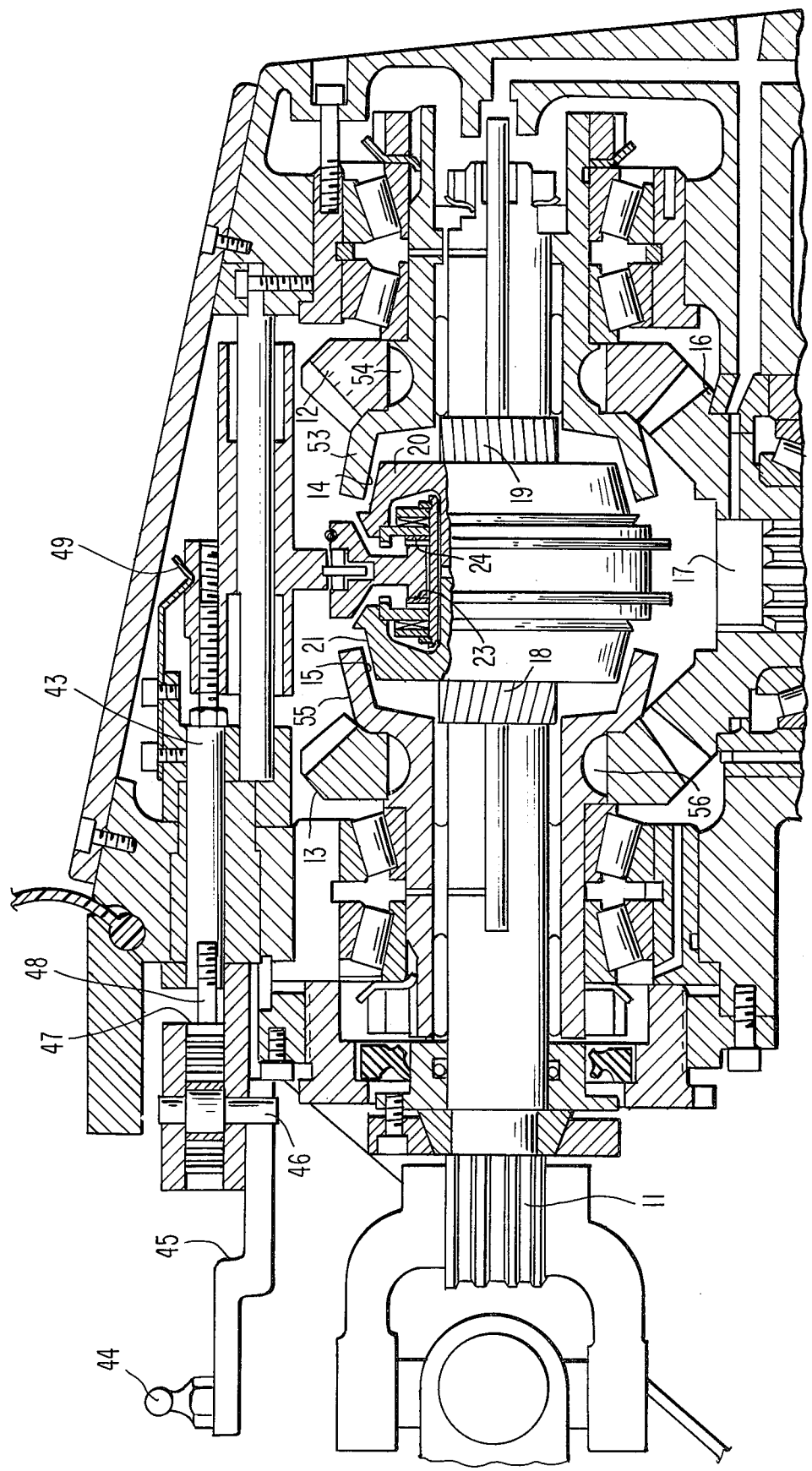
FIG. 1 shows a entire clutch shifting mechanism and associated parts in an inboard-outboard marine drive.

First, consider the clutch mechanism which is the subject of the copending Brownlie application. The clutch mechanism includes an input shaft 11 which is connected to the marine engine. Beveled forward driving gear 12 and beveled reverse driving gear 13 rotate on the input shaft 11. Forward gear 12 has a cup member 53 having a cone surface 14 formed thereon and reverse gear 13 is associated with a cup member 55 also having a conical clutch surface 15.

Gears 12 and 13 engage in output gear 16 which is affixed to the output shaft 17. Shaft 17 is connected to a marine propulsion unit, usually a propeller. The details of the connection between the output shaft and the propeller are more fully shown in the afore said Brownlie and Daly patent application. In the neutral position, the output shaft 17 and the engaged gears 12, 13, and 16 do not rotate.

The input shaft 11 has a right hand spiral thread 18 and a left hand spiral thread 19 formed thereon. Clutch element 20 has, on the inner axial surface thereof, a right hand spiral thread which matches that of spiral thread 18. Similarly, clutch element 21 has a left hand spiral thread, which matches spiral thread 19. Clutch element 20 has a cone clutch surface which mates with clutch surface 15, and clutch element 21 has a cone clutch surface which mates with the surface 14.

Figure 2:
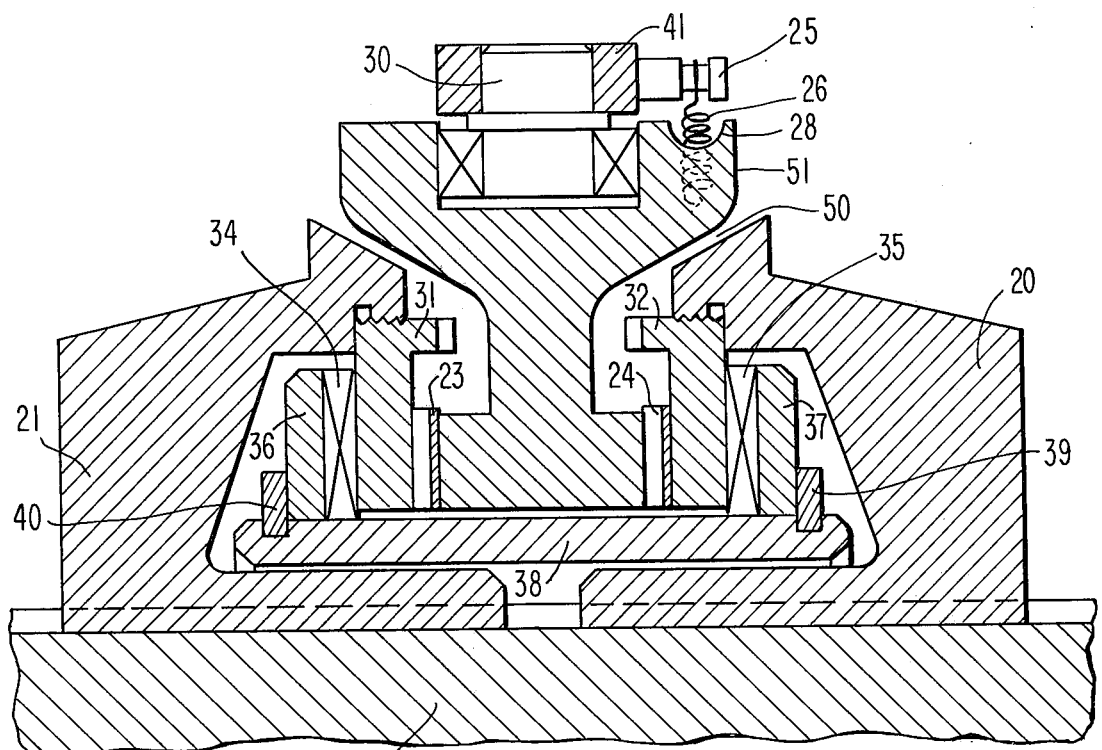
FIG. 2 is a sectional view showing the detail of the clutch shift mechanism.

In the neutral position, both clutch elements 20 and 21 rotate with the input shaft 11. The shifting mechanism includes a shift ring 51. The input shaft 11 passes axially through a hole in the center of the ring. The shift ring 51 is positioned between clutch elements 20 and 21 in the manner depicted. The shifting mechanism advantageously includes two annular spring members 23 and 24, which may be wave washers. As best seen in FIG. 2, spring means 23 and 24 are disposed at either side of shift ring 22. Axial movement of the shift ring to the left compresses spring means 23 until the ring engages a mating surface of clutch element 21. Spring means 23 abuts against a steel flange 31 which is threaded into the clutch element 21. Similarly, a flange 32 is threaded into clutch element 20 and provides it with an inner radial surface for engagement with spring means 24. Roller thrust bearings 34 and 35 are provided so that the cone clutch elements 20 and 21 can counter-rotate freely with respect to one another. Thrust washers 36 and 37 are provided to absorb the thrust. A sleeve 38 couples the two clutch elements together. Snap rings 39 and 40 snap into the sleeve 38 and hold the assembly together so that upon translation of one of the clutch elements, one of the plates 31, 32 associated therewith causes sleeve 38 and thus the other of the clutch elements to be translated along with it.

Referring now to FIG. 1, the shift linkage includes a bifuricated fork 41 which rides in a groove in shift ring 22. A shift rod 43 is threaded into the fork 41, and the shift cable (not shown) is connected to the ball 44. The shift cable moves into and out of the plane of the drawing in which ball 44 is depicted. The lever 45 pivots about pin 46, and this rotating motion of shift lever 45 is converted into axial left and right movement by pinion 47 which engages a mating rack 48. The rack 48 is threaded into the shift rod 43 as shown. Therefore, a shifting operation is achieved by moving the ball 44 perpendicular to the plane of the figure. This motion is converted by the rack 48 to a left and right hand or axial movement of the shift rod 43 which in turn moves the shift fork left or right as the case may be. In order to establish a stable neutral positon, a detent spring 49 engages a notch in the shift fork.

The operation of the clutch is as follows. Initially the clutch is assumed to be in the neutral position shown in FIG. 1. When it is desired to shift the clutch into forward, the shift linkage is moved to the right. Consider first static shifting. As the fork 41 moves to the right, the tapered inner surface of shoulder 51 engages the mating, tapered periphery of clutch element 20. The ring then beings to urge the annular clutching element to the right. Since the clutching element is located on the stationary input shaft by means of spiral threads 19, in order to be translated to the right it must rotate in accordance with the pitch of the threads. However, due to the engagement of the outer periphery of the shifting element by the matching tapered shoulder of the shifting ring, considerable friction exists therebetween which opposes the rotation of the clutching element. In order to lessen this friction, the area of engagement between the shifting element and the shift ring could be decreased to a few points; however, the resulting decrease in mating area between the shift ring and the clutch element might cause the clutch element to become cocked on the shaft, further impeding its translation. In copending application Ser. No. 501841, referred to hereinabove, the problem thus posed is overcome by providing an additional contact area disposed radially inward of the tapered shoulders, which due to its lessened radius exerts a commensurately lesser torque drag on the clutch element. Nonetheless, the resulting friction still impedes the rotation of the element as it traverses the spiral threads. Of course, anything done to decrease the friction between the shoulder of the shifting ring 22 and clutch element 20 will result in a decreased torque drag, which torque drag is relied upon to effect dynamic shifting to be described below.

In order to overcome the problem thus posed, the inventor provides a groove extending about the periphery of shifting ring 51, which receives a pin 30 extending from fork 41, and a frictionless bearing 33 disposed thereon. In this manner, ring 51 is free to rotate cluch elements 20 or 21 with a minimum of friction. By doing so, it allows the clutch element engaged thereby to rotate in accordance with the pitch of the spiral threads until it comes into engagement with the selected forward or reverse gear.

Figure 3:
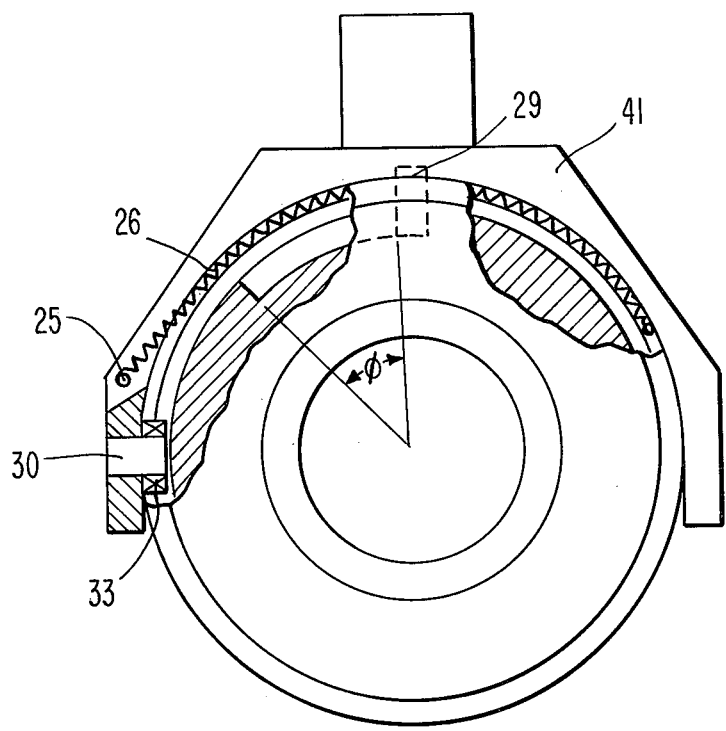
FIG. 3 shows an associated shift ring and shifting linkage assembly constructed in accordance with the invention.

Referring now to FIG. 3 there are shown means for limiting the overall rotation of ring 51, and for resiliently returning it to its original position. As shown in FIG. 3, a pin 29 extending from shifting fork 21 to an arcuate groove formed in the periphery of shifting ring 51. The angle $\phi$ subtended by the groove determines the maximum angular displacement to be allowed the ring. In order to return the shifting ring to its original position after the rotation thereof, a pin 25 is provided extending from shift arm 41. One end of an elongate tension-type coil spring 26 is hooked to pin 25, the other end therof being secured to a suitable point on ring 51. In order to locate the spring away from moving parts, ring 51 is provided with groove or channel 28 about the periphery thereof. In this manner, the spring ring 26, yieldingly opposing rotation of the ring and causing it to return to a position determined by the stop means which comprehends pin 29 and the associated slot in which it is located.

Now consider dynamic shifting into forward. As force is exerted by the shifting linkage upon the shift ring 51, the annular shoulder 51 of shifting ring is brought into frictional engagement with a matching surface on clutch element 20. The initial contact between the shift ring and the clutch element produces sufficient friction to overcome the torsional bias of spring 26, and ring 51 rotates with clutch element 20 until pin 29 encounters the end of the slot in which it is disposed. When this occurs, rotation of the shift ring abruptly ceases and a high torque drag is produced along the outer radial surface of clutch element 20.

As the counter-torque from non-rotating ring 22 slows rotation of clutch element 20, the spiral threads 19 act to drive the clutch element axially toward the right. The conical surface on element 20 engages the mating surface 14 of the cup element associated with beveled gear 12. Friction between the two mating conical surfaces drives the member 20 hard toward the right into firm mating engagement with the assembly of bevel gear 12. This drives the output shaft 17 in the forward direction. Thus, motor torque is effectively used to drive the clutch element 20 to the right into firm mating engagement with the clutch surface of the beveled gear 12.

Note that the ring 51 applies force uniformly around 360° to the element 20. Attempts to move the clutch element 20 axially by force at one point such as by a pin, or even around a portion around the periphery as by a shift fork have not been entirely successful. This is for the reason that such concentrated force tends to cock the element 20 with respect to the input shaft so that the driving spiral thread cannot move the element 20 smoothly in an axial direction.

When the clutch is to be disengaged from the forward position, the shift ring 51 is moved axially to the left. However, due to the above-described activity of the helical threads 19, the torque drag exerted against clutch element 21 by the left shoulder 52 of the shift ring will not be sufficient to disengage the clutch. As force is exerted by the shifting linkage 41 upon the shift ring 51, the shift ring rotates and spring element 26 is stretched until the abovedescribed stop mechanism causes it to cease rotating. A substantial retarding torque is then transmitted to clutch element 21. The threaded engagement between the spiral threads 18 and the mating spiral threads within the element 21 then drives the clutch element 21 toward the left. This brings the element 20 along to the left, counter-rotating with respect to element 21 as it moves out of engagement with the clutch surface 14 associated with bevel gear 12. In this manner, the engine torque is effectively used to disengage the clutch as well as to engage it.

Shifting the clutch into reverse is effected in the same manner as previously described except that the shift ring 51 is moved toward the left from the neutral position.

The clutch surface on each driving gear is provided by a cupped member. The cup member 53 is attached to gear 12 by the key 54, and cup member 55 is attached to gear 13 by the key 56. The cupped members advantageously have a larger radius than that of the driving gear. In this manner the clutch has greater torque capacity than would otherwise be provided by a clutch surface within, and therefore limited by the radius of the driving gear.

Returning to FIG. 2 it will be seen that spring means, herein represented as wave washers 23 and 24, are disposed between shift ring 51 and ones of the clutch elements. Although not necessary to the operation of the invention in all embodiments, the provision of a slight bias between the clutch elements and the shifting ring is though advantageous in that it keeps the associated clutching elements from tilting or cocking when the shifting ring is not in engagement therewith.

While particular embodiments of the invention have been shown and described, it will be appreciated that various modifications are within the true spirit and scope of the invention. The appended claims are intended to cover such modifications.

What is claimed is new and desired to be secured by Letters Patent of the United States is:

1. In a clutch mechanism of the type comprising an input shaft having first and second oppositely pitched dirving spiral threads thereon, an output shaft, forward and reverse driving gears rotatably mounted on said input shaft, each of said gears having a clutch surface associated therewith, an output gear affixed to said output shaft and engaged with driving gears, and first and second clutch elements each having threads which respectively match said first and second driving spiral threads, each having a clutch surface for frictionally engaging a corresponding surface on said forward and reverse gears, respectively, and further having a surface for receiving force for causing said clutch surface to engage a corresponding surface on one of said gears, an improved shifting mechanism comprising:
a shift ring movable axially by shift linkage, said ring being disposed coaxially with said input shaft and between said clutch elements, and having formed at opposite sides thereof surfaces for contacting ones of said clutch elements;
means coupled between said shift ring and said shift linkage for resiliently opposing rotation of said ring with respect to said linkage; and
stop means for positively limiting the rotation of said ring with respect to said linkage to a predetermined angular displacement.

2. The invention defined in claim 1, wherein said means coupled between said shift ring and said shift linkage comprises a coil spring having one end anchored to said shift linkage.

3. The invention defined in claim 2, wherein said spring means is disposed in a groove extending about the periphery of said shift ring.

4. The invention defined in claim 3, wherein said stop means comprises a rigid pin associated with said linkage, and said shift ring has formed therein a slot for receiving said pin in order to limit angular displacement of said ring.

5. The invention defined in claim 4, further including first and second annular spring means disposed at either side of said shift ring for maintaining the axes of said clutch elements substantially colinear.

6. The invention defined in claim 5, wherein said first and second annular spring means comprise wave washers.

7. In a clutch mechanism of the type comprising an input shaft having first and second oppositely pitched driving spiral threads thereon, an output shaft, forward and reverse driving gears rotatably mounted on said input shaft, each of said gears having a clutch surface associated therewith, an output gear fixed to said output shaft and engaged with said driving gears, and first and second clutch elements having a clutch surface respectively mating with the clutch surface of said forward and reverse gears, respectively, an improved shifting mechanism comprising:
a shifting ring disposed coaxially about said input shaft and between said first and second clutch elements,
means resiliently coupling said shift ring and said shifting arm for opposing rotation of said ring with respect to said arm;
means for positively limiting rotation of said ring with respect to said arm to an included angle of less than 360°;
annular shoulders formed on opposite sides of said shift ring; and
an anular surface on each of said first and second clutch elements matching said annular shoulders on said shift ring so that axial movement of said shift ring causes uniform contact between one of said annular shoulders and a matching annular surface to slow the rotation of said element on said input shaft whereby the spiral threads drive said elements in an axial direction into clutch engagement or disengagement with ones of said forward or reverse gears.

8. The invention defined in claim 7, wherein said resilient means comprises coil spring means having a first end coupled to said shifting linkage and a second end coupled to said shift ring.

9. The invention defined in claim 8, further including spring washer means disposed upon opposite sides of said shift ring to provide axial bias between said shift ring and said first and said second clutch elements.

10. The invention defined in claim 9, wherein said coil spring means is disposed in a groove formed in the periphery of said shift ring.

11. The invention defined in claim 10, wherein said stop means comprises a pin rigidly associated with said shifting linkage, and an arcuate slot formed in said shift ring for receiving said pin.

* * * * *